United States Patent
Rosa et al.

(10) Patent No.: US 11,166,295 B2
(45) Date of Patent: Nov. 2, 2021

(54) HIGH RELIABLE LOW LATENCY DATA TRANSMISSION USING GRANT-LESS UPLINK TRANSMISSION FORMAT ON SCHEDULED PUSCH RESOURCES

(71) Applicant: Nokia Technologies Oy, Espoo (FI)

(72) Inventors: Claudio Rosa, Randers NV (DK); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/631,140

(22) PCT Filed: Aug. 7, 2018

(86) PCT No.: PCT/FI2018/050574
§ 371 (c)(1),
(2) Date: Jan. 14, 2020

(87) PCT Pub. No.: WO2019/030431
PCT Pub. Date: Feb. 14, 2019

(65) Prior Publication Data
US 2020/0137777 A1    Apr. 30, 2020

Related U.S. Application Data

(60) Provisional application No. 62/542,862, filed on Aug. 9, 2017.

(51) Int. Cl.
*H04W 72/12* (2009.01)
*H04L 1/00* (2006.01)

(52) U.S. Cl.
CPC ....... *H04W 72/1242* (2013.01); *H04L 1/0013* (2013.01); *H04W 72/1268* (2013.01); *H04W 72/1289* (2013.01)

(58) Field of Classification Search
CPC ......... H04W 72/1268; H04W 72/1242; H04W 72/1289; H04W 72/12; H04L 1/0013;
(Continued)

(56) References Cited

U.S. PATENT DOCUMENTS

| | | | |
|---|---|---|---|
| 2015/0078231 A1* | 3/2015 | Bergstrom | H04W 72/1268 370/311 |
| 2016/0100430 A1* | 4/2016 | Dabeer | H04W 74/08 370/329 |

(Continued)

FOREIGN PATENT DOCUMENTS

| | | |
|---|---|---|
| WO | 2013/154475 A1 | 10/2013 |
| WO | 2017/147515 A1 | 8/2017 |
| WO | 2018/031770 A1 | 2/2018 |

OTHER PUBLICATIONS

Samsung: "On grant-free UL transmissions for URLLC", 3GPP TSG RAN WG1 Meeting #88 R1-1702996; Athens, Greece, Feb. 13-17, 2017. (Year: 2017).*

(Continued)

*Primary Examiner* — Nathan S Taylor
(74) *Attorney, Agent, or Firm* — Harrington & Smith (57) ABSTRACT

In accordance with example embodiments of the invention there is at least a method and apparatus to perform receiving at a user equipment an indication of a scheduled resource for an uplink shared channel transmission by the user equipment; determining that a high reliability low latency communication is to be transmitted by the user equipment; and based on the determining, prioritizing a transmission of the high reliability low latency communication on the scheduled resource of the uplink shared channel using a selected transport format to encode the high reliability low latency communication. Further, there is at least a method and apparatus to perform sending to a user equipment an indication of a scheduling resource for an uplink shared channel (Continued)

transmission by the user equipment; and in response to the sending, receiving from the user equipment said uplink shared channel transmission using a selected transport format.

19 Claims, 4 Drawing Sheets

(58) Field of Classification Search
CPC . H04L 1/08; H04L 5/0064; H04L 1/00; H04L 5/00
USPC .......................................................... 370/330
See application file for complete search history.

(56) References Cited

U.S. PATENT DOCUMENTS

| | | | |
|---|---|---|---|
| 2016/0270102 A1* | 9/2016 | Zeng | H04W 72/048 |
| 2017/0208610 A1* | 7/2017 | Tang | H04W 72/1205 |
| 2017/0367036 A1* | 12/2017 | Chen | H04L 43/08 |
| 2017/0367110 A1* | 12/2017 | Li | H04W 74/0816 |
| 2017/0367116 A1* | 12/2017 | Li | H04W 72/048 |
| 2018/0098250 A1* | 4/2018 | Vrzic | H04W 36/0016 |
| 2018/0270699 A1* | 9/2018 | Babaei | H04W 72/0453 |
| 2018/0323909 A1* | 11/2018 | Ying | H04L 1/0072 |
| 2018/0359711 A1* | 12/2018 | Akkarakaran | H04W 52/325 |
| 2019/0007963 A1* | 1/2019 | Akkarakaran | H04W 72/0406 |
| 2019/0281622 A1* | 9/2019 | Hwang | H04W 72/1273 |
| 2020/0228230 A1* | 7/2020 | Mukherjee | H04L 1/1893 |
| 2020/0267753 A1* | 8/2020 | Adjakple | H04W 72/1226 |
| 2020/0288482 A1* | 9/2020 | Yi | H04W 72/121 |

OTHER PUBLICATIONS

ZTE: "Basic Grant-free Transmission for URLLC", 3GPP TSG RAN WG1 Meeting #88 R1-1701594; Athens Greece Feb. 13-17, 2017 (Year: 2017).*

ZTE: "Advanced Grant-free Transmission for URLLC", 3GPP TSG RAN WG1 Meeting #88 R1-1701596; Athens Greece Feb. 13-17, 2017 (Year: 2017).*

International Search Report and Written Opinion received for corresponding Patent Cooperation Treaty Application No. PCT/FI2018/050574, dated Oct. 25, 2018, 15 pages.

Huawei et al.; "Grant-free transmission for UL URLLC"; R1-1704222; 3GPP TSG RAN WG1 Meeting #88b; Spokane, USA; Apr. 3-7, 2017; whole document (7 pages).

Samsung; "Grant-free and grant-based UL transmissions"; R1-1710724; 3GPP TSG RAN WG1 NR Ad Hoc; Qingdao, China; Jun. 27-30, 2017; whole document (4 pages).

Intel Corporation; "Multiplexing of UL transmissions with different data durations and latency requirements"; R1-1710576; 3GPP TSG RAN WG1 NR Ad Hoc#2; Qingdao, P.R. China; Jun. 27-30, 2017; whole document (5 pages).

LG Electronics; "Summary of [89-22] Email discussion about UL data transmission without UL grant"; RI-1710328; 3GPP TSG RAN WG1 Ad Hoc#2; Qingdao, P.R. China; Jun. 27-30, 2017; whole document (41 pages).

* cited by examiner

HIGH RELIABLE LOW LATENCY DATA TRANSMISSION USING GRANT-LESS UPLINK TRANSMISSION FORMAT ON SCHEDULED PUSCH RESOURCES

RELATED APPLICATION

This application was originally filed as PCT Application No. PCT/FI2018/050574, filed on 7 Aug. 2018, which claims priority from U.S. Provisional Application No. 62/542,862, filed on 9 Aug. 2017.

TECHNICAL FIELD

The teachings in accordance with the exemplary embodiments of this invention relate generally to provisioning of high reliability and low latency transmissions in a communication network and, more specifically, relate to enabling and prioritizing grant-less uplink (GUL) transmissions of high reliable low latency data using a scheduling grant.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AP Access Point
CCA Clear channel assessment
DL Downlink
GUL Grant-less Uplink
HARQ Hybrid automatic repeat request
HRLLC High reliable low latency communication
HRLL High reliable low latency
LAA Licensed Assisted Access
LBT Listen-before-talk
MCS Modulation & coding scheme
PRACH Physical random access channel
PRB Physical resource block
PUSCH Physical uplink shared channel
SPS Semi-persistent scheduling
TB Transport block
TBS Transport block size
UCI Uplink control information
UE User equipment
UL Uplink Over the past several years the use of smartphones and other smart devices has resulted in accelerated growth of data traffic over communication networks. With this growth there have been many new applications created that try to improve usage of wireless connectivity for these types of devices. New communication technologies are being implemented and older technologies are being improved for these applications. One such communication technology includes Fifth generation (5G) wireless networks which are being implemented to support diverse services including very low latency and high delay tolerant services. A primary requirement for these services is that connectivity with a very large number of devices such as smart-phones, tablets, and other communication devices must be supported. As a result issues arise due to the large scale connectivity requirements and as well as signaling overhead and latency needed for this connectivity.

MulteFire is an LTE-based technology for small cells operating in an unlicensed spectrum. MulteFire is implemented to broaden the use of LTE to additional markets and entities without a licensed spectrum and to enhance user experiences of voice and video services for local area internet access. MulteFire is an LTE-based technology that is intended to operate solely in unlicensed spectrum combining the performance benefits of LTE with the simplicity of Wi-Fi like deployments. MulteFire is expected to deliver enhanced coverage, increased capacity, full mobility for better user experiences, and security in local area deployments.

In MulteFire 1.1, scheduled PUSCH is always prioritized over GUL. A problem being that the UE monitors the common PDCCH and avoid GUL in scheduled full DL subframes. There are some proposals to allow multiplexing of scheduled and GUL transmissions from different UEs, but the underlying assumption in MulteFire Alliance is that for a given UE, scheduled transmission is always prioritized over GUL. It is noted that so far prior art solutions contributed to MulteFire Alliance do not solve this problem.

The example embodiments of the invention work to at least address the above identified problems and provide a novel method to reduce overhead and latency and increase communication speeds in communication networks such as legacy networks or new technology networks including 5G and newer technologies.

SUMMARY

In one example embodiment of the invention, a method comprises receiving at a user equipment an indication of a scheduled resource for an uplink shared channel transmission by the user equipment; determining that a high reliability low latency communication is to be transmitted by the user equipment; and based on the determining, prioritizing a transmission of the high reliability low latency communication on the scheduled resource of the uplink shared channel using a selected transport format to encode the high reliability low latency communication.

A further example embodiment of the invention is a method comprising the method of the previous paragraph, wherein the indication is received in an uplink grant, wherein the high reliability low latency communication by the user equipment applies a grant-less uplink transport format, wherein the uplink grant is allocating scheduling resources for the uplink shared channel transmission, wherein the prioritizing comprises: preparing the high reliability low latency communication using a grant-less uplink transport format to be transmitted on the scheduled uplink shared channel resource, wherein the selected transport format comprises a grant-less uplink transport format, wherein the transmission of the high reliability low latency communication includes GUL uplink control information based on a use of the grant-less uplink transport format, wherein a grant-less uplink transport format is defined based on a single configured format or alternatively selected by the apparatus from the set of more than one configured grant-less uplink transmissions formats, wherein the preparing comprises applying rate matching parameters to map the high reliability low latency communication using a grant-less uplink transport format to the scheduled resources provided by the uplink grant, wherein the applying comprises repeating the high reliability low latency communication using a grant-less uplink transport format to fill all available scheduled resources provided by the uplink grant, wherein the transmission of the high reliability low latency communication includes uplink control information, and wherein the uplink control information is indicative of a grant-less uplink transport format selected for the transmission.

In another example embodiment of the invention, there is an apparatus comprising: at least one processor; and at least one memory including computer program code, where the at least one memory and the computer program code are configured, with the at least one processor, to cause the apparatus to at least: receive at a user equipment an indication of a scheduled resource for an uplink shared channel transmission by the user equipment; determine that a high reliability low latency communication is to be transmitted by the user equipment; and based on the determining, prioritize a transmission of the high reliability low latency communication on the scheduled resource of the uplink shared channel using a selected transport format to encode the high reliability low latency communication.

A further example embodiment of the invention is an apparatus comprising the apparatus of the previous paragraph, wherein the indication is received in an uplink grant, wherein the high reliability low latency communication by the user equipment applies a grant-less uplink transport format, wherein the uplink grant is allocating scheduling resources for the uplink shared channel transmission, wherein the prioritizing comprises: preparing the high reliability low latency communication using a grant-less uplink transport format to be transmitted on the scheduled uplink shared channel resource, wherein the selected transport format comprises a grant-less uplink transport format, wherein the transmission of the high reliability low latency communication includes GUL uplink control information based on a use of the grant-less uplink transport format, wherein a grant-less uplink transport format is defined based on a single configured format or alternatively selected by the apparatus from the set of more than one configured grant-less uplink transmissions formats, wherein the preparing comprises applying rate matching parameters to map the high reliability low latency communication using a grant-less uplink transport format to the scheduled resources provided by the uplink grant, wherein the applying comprises repeating the high reliability low latency communication using a grant-less uplink transport format to fill all available scheduled resources provided by the uplink grant, wherein the transmission of the high reliability low latency communication includes uplink control information, wherein the uplink control information is indicative of a grant-less uplink transport format selected for the transmission.

In another example embodiment of the invention, there is an apparatus comprising: means for receiving at a user equipment an indication of a scheduled resource for an uplink shared channel transmission by the user equipment; means for determining that a high reliability low latency communication is to be transmitted by the user equipment; and means, based on the determining, for prioritizing a transmission of the high reliability low latency communication on the scheduled resource of the uplink shared channel using a selected transport format to encode the high reliability low latency communication.

A further example embodiment of the invention is an apparatus comprising the apparatus of the previous paragraph, wherein the indication is received in an uplink grant, wherein the high reliability low latency communication by the user equipment applies a grant-less uplink transport format, wherein the uplink grant is allocating scheduling resources for the uplink shared channel transmission, wherein the means for prioritizing comprises: means for preparing the high reliability low latency communication using a grant-less uplink transport format to be transmitted on the scheduled uplink shared channel resource, wherein the selected transport format comprises a grant-less uplink transport format, wherein the transmission of the high reliability low latency communication includes GUL uplink control information based on a use of the grant-less uplink transport format, wherein a grant-less uplink transport format is defined based on a single configured format or alternatively selected by the apparatus from the set of more than one configured grant-less uplink transmissions formats, wherein the means for preparing comprises means for applying rate matching parameters to map the high reliability low latency communication using a grant-less uplink transport format to the scheduled resources provided by the uplink grant, wherein the applying comprises repeating the high reliability low latency communication using a grant-less uplink transport format to fill all available scheduled resources provided by the uplink grant, wherein the transmission of the high reliability low latency communication includes uplink control information, wherein the uplink control information is indicative of a grant-less uplink transport format selected for the transmission.

In another example embodiment of the invention, a method comprises sending to a user equipment an indication of a scheduling resource for an uplink shared channel transmission by the user equipment; and in response to the sending, receiving from the user equipment said uplink shared channel transmission using a selected transport format.

A further example embodiment of the invention is a method comprising the method of the previous paragraph, wherein the indication is sent in an uplink grant, wherein the uplink grant is allocating scheduling resources for the uplink shared channel transmission, wherein the uplink shared channel transmission applies the scheduled uplink shared channel transport format, wherein the uplink shared channel transmission applies a grant-less uplink transport format, wherein the transmission comprises a high reliability low latency communication received from the user equipment, wherein the at least one memory including the computer program code is configured with the at least one processor to determine whether the transmission includes uplink control information, wherein for a case it is determined that the transmission includes uplink control information, the at least one memory including the computer program code is configured with the at least one processor to cause the apparatus to identify the selected transport format as a grant-less uplink transport format, wherein for a case it is determined that the transmission does not include uplink control information, the at least one memory including the computer program code is configured with the at least one processor to cause the apparatus to identifying the selected transport format as a scheduled uplink shared channel transport format.

In another example embodiment of the invention, there is an apparatus comprising: at least one processor; and at least one memory including computer program code, where the at least one memory and the computer program code are configured, with the at least one processor, to cause the apparatus to at least: send to a user equipment an indication of a scheduling resource for an uplink shared channel transmission by the user equipment; and in response to the sending, receive from the user equipment said uplink shared channel transmission using a selected transport format.

A further example embodiment of the invention is an apparatus comprising the apparatus of the previous paragraph, wherein the indication is sent in an uplink grant, wherein the uplink grant is allocating scheduling resources for the uplink shared channel transmission, wherein the uplink shared channel transmission applies the scheduled uplink shared channel transport format, wherein the uplink shared channel transmission applies a grant-less uplink transport format, wherein the transmission comprises a high reliability low latency communication received from the user equipment, wherein the at least one memory including the computer program code is configured with the at least one processor to determine whether the transmission includes uplink control information, wherein for a case it is determined that the transmission includes uplink control information, the at least one memory including the computer program code is configured with the at least one processor to cause the apparatus to identify the selected transport format as a grant-less uplink transport format, wherein for a case it is determined that the transmission does not include uplink control information, the at least one memory including the computer program code is configured with the at least one processor to cause the apparatus to identifying the selected transport format as a scheduled uplink shared channel transport format.

In another example embodiment of the invention, there is an apparatus comprising: means for sending to a user equipment an indication of a scheduling resource for an uplink shared channel transmission by the user equipment; and means, in response to the sending, for receiving from the user equipment said uplink shared channel transmission using a selected transport format.

A further example embodiment of the invention is an apparatus comprising the apparatus of the previous paragraph, wherein the indication is sent in an uplink grant, wherein the uplink grant is allocating scheduling resources for the uplink shared channel transmission, wherein the uplink shared channel transmission applies the scheduled uplink shared channel transport format, wherein the uplink shared channel transmission applies a grant-less uplink transport format, wherein the transmission comprises a high reliability low latency communication received from the user equipment, wherein the at least one memory including the computer program code is configured with the at least one processor to determine whether the transmission includes uplink control information, wherein for a case it is determined that the transmission includes uplink control information, the at least one memory including the computer program code is configured with the at least one processor to cause the apparatus to identify the selected transport format as a grant-less uplink transport format, wherein for a case it is determined that the transmission does not include uplink control information, the at least one memory including the computer program code is configured with the at least one processor to cause the apparatus to identifying the selected transport format as a scheduled uplink shared channel transport format.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose a method and apparatus enabling grant-less uplink (GUL) transmission of high reliable low latency data using a scheduling grant such as in cases where GUL resources would be colliding with scheduled physical uplink shared channel (PUSCH) resources.

Figure 1:
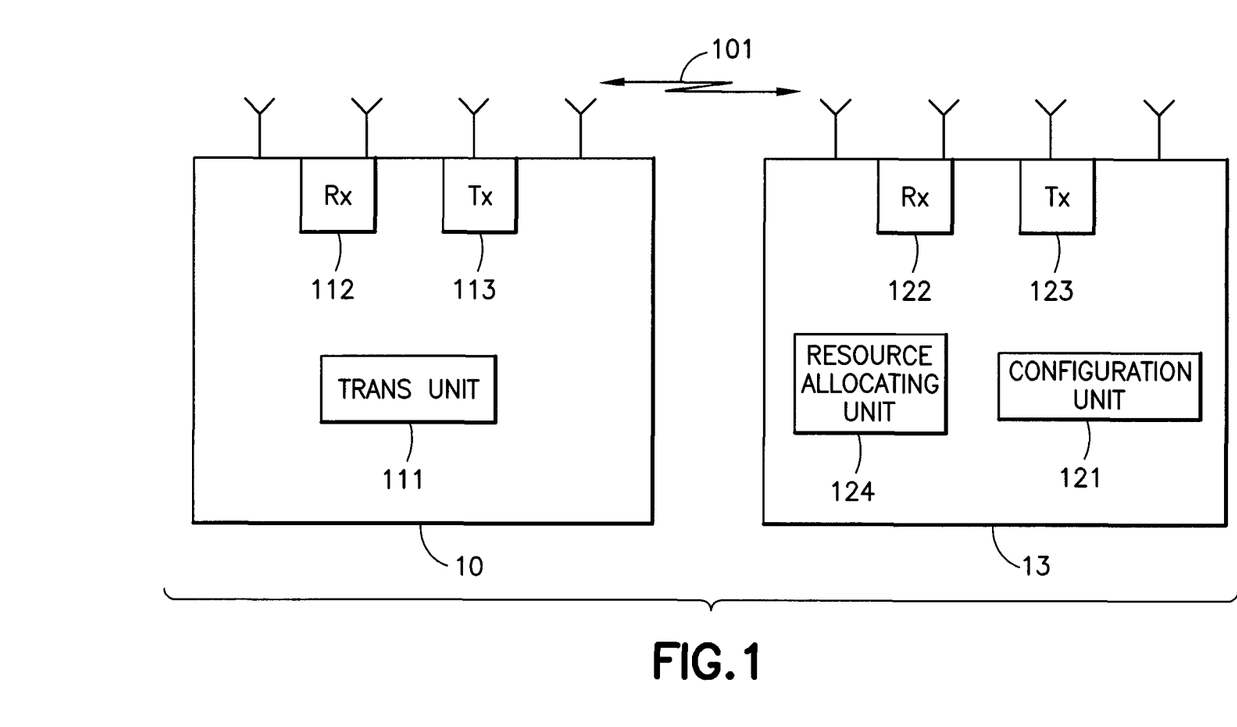
FIG. 1 shows a simplified architecture of a radio access network and schematic diagrams of apparatus according to an embodiment.

For a general radio communication architecture, such as LTE or other communication technology, of network devices is illustrated in FIG. 1. FIG. 1 is a simplified architecture only showing user equipment 10 configured to be in a wireless connection on communication channels 101 (only one shown in FIG. 1) in a cell with a base station 13 providing the cell, both apparatuses having some elements and functional entities, all being logical units whose implementation may differ from what is shown. It is apparent to a person skilled in the art that the radio access comprises one or more base stations serving potentially many user equipment.

The user equipment 10 illustrates one type of an apparatus to which resources on the air interface are allocated and assigned, and thus any feature described herein with user equipment may be implemented with a corresponding apparatus, such as a relay node. An example of such a relay node is a layer 3 relay (self-backhauling relay) towards the base station. The user equipment 10 refers to a portable computing device that includes wireless mobile communication devices operating with or without a subscriber identification module (SIM), including, but not limited to, the following types of devices: mobile phone, smartphone, personal digital assistant (PDA), handset, laptop computer. The user equipment 10 is configured to perform one or more of user equipment functionalities described below with an embodiment, and it may be configured to perform functionalities from different embodiments. For this purpose, the user equipment comprises a Trans unit 111 for providing functionality to receive scheduling information via the receiver interface Rx 112 and use the scheduling information to perform transmission of high reliability low latency communication via the interface Tx 113 in accordance with the example embodiments as described herein.

The base station, or advanced evolved 13 is a computing device configured to control the radio resources, and connected to a communication system and/or an unlicensed band (not shown in FIG. 1) thereby providing the user equipment 10 a connection to the communication system. In other words, in the illustrated embodiment, all radio-related functionalities of the communication system are located in the base station which, for example, configures connection parameters and scheduling controls for the user equipment.

The base station 13 is configured to perform one or more of base station functionalities as at least described below, and it may be configured to perform functionalities from different embodiments. For this purpose, the base station comprises a configuration unit 121 for providing functionality to configure communication grants and identify transport formats of communications in accordance with the example embodiments as described herein, and a resource allocator unit 124 for allocating resources e.g., via interface Tx 123 in accordance with the example embodiments as described herein. The resource allocator unit 124 may be integrated with the configuration unit, or with a physical uplink shared channel scheduler (not shown in FIG. 1). Further, the apparatus comprises a receiving unit 122 for receiving different inputs, control information, user data and transmissions e.g., via interface Rx 122.

The example embodiments of the invention are operable in the provision of high reliability and low latency in a communication spectrum, such as an unlicensed spectrum. Further, it is noted that although the description herein may refer to a use of the embodiments with an unlicensed spectrum, this is non-limiting and the proposed embodiments (or at least some aspects of it) may also be applicable to operation in a licensed spectrum or both. Such spectrums can include 5G, or LTE Rel 15 related spectrums, for example spectrums used especially for provision of high reliability and low latency in unlicensed spectrum, where Grant-less uplink transmission, or Grant-free uplink transmission is used.

In this regard, the example embodiments may apply to ultra-reliable low-latency communication for LTE. Grant-free uplink is also considered for standardization of New Radio in Release 15 of the 3GPP specifications as well as part of the URLLC for LTE work. Moreover, grant-less uplink transmission is also considered for the second release of the MulteFire specifications (Release 1.1). GUL can be used to reduce latency in the uplink direction of transmission. Example embodiments of the invention deal with UE behavior when GUL resources are available simultaneously to a scheduled PUSCH transmission and the UE can only transmit on GUL or PUSCH resources. Moreover, example embodiments of the invention deal with UE behavior when GUL for highly reliable data communication is configured for the UE but there is only a scheduled PUSCH transmission available at a certain time. Further, in accordance with an example embodiment of the invention if there is no physical GUL resource available at the time of a scheduled PUSCH transmission, the HRLLC data can still be mapped on a scheduled PUSCH based on overall GUL HRLLC configuration.

It is noted that baseband signals representing the PUSCH can be defined in terms of:
  scrambling;
  modulation of scrambled bits to generate complex-valued symbols;
  mapping of precoded complex-valued symbols to resource elements;
  mapping of the complex-valued modulation symbols onto one or several transmission layers;
  transform precoding to generate complex-valued symbols;
  precoding of the complex-valued symbols; and
  generation of complex-valued time-domain SC-FDMA signal for each antenna port This invention discloses the behavior, in case a UE is configured for grant-less uplink communication to support some critical highly reliable and low latency data and has HRLL data to transmit and is further granted in a certain time instance (such as a transmission time interval or subframe) with scheduled uplink shared channel resources. In case the physical GUL and scheduled PUSCH resources are on overlapping time and frequency domain resources (e.g. on the same component carrier), the question is how to manage the prioritization of the HRLL data given the available physical resources for the UE (GUL resources and PUSCH resources).

An obvious solution a) would be to transmit the HRLL data using the physical GUL resources and the GUL transmission format (MCS, TBS, etc.). However, in case for example the GUL occasion collides with an ongoing multi-subframe PUSCH transmission for which the UE has already obtained channel clearance, this would potentially require the UE to either stop transmission and perform again LBT before starting transmission on GUL resources, or continue transmission without LBT on GUL resources.

The main disadvantage of these solutions is that they both require the eNB to perform blind decoding on PUSCH and GUL resources as the eNB has no prior knowledge of which resources the UE will use for transmission. Also, solution a) has also the disadvantage that by suspending transmission on the unlicensed spectrum the UE risks to lose access to the channel.

The example embodiments of the invention deal with problems presented by use of the unlicensed spectrum, though it is noted that the proposed solution (or at least some aspects of it) may also be applicable to operation in any licensed spectrum or a combination of spectrums.

For high reliable low latency communication in unlicensed spectrum, it should be possible for a UE to prioritize a GUL transmission over a simultaneously scheduled PUSCH transmission at least for the following reasons:
  GUL/SPS transmission may have lower processing delay than a scheduled transmission and the UE may simply not have the time to include HRLCC data in the TB to be transmitted on the scheduled resources (PUSCH).
  In some cases, the data being scheduled for transmission on PUSCH is a retransmission—which makes it impossible for the UE to include HRLCC data in the TB to be transmitted using the scheduled PUSCH resources (even if in principle it would have had the time for that).

An example embodiment of the invention provides a solution enabling GUL transmission of high reliable low latency data in cases where GUL resources are colliding with scheduled PUSCH resources (at least in time domain, but possibly also in frequency domain) and GUL transmission is prioritized over scheduled PUSCH transmission.

An example embodiment of the invention provides a solution enabling GUL transmission of high reliable low latency data in cases where no GUL resources are available at the time of a scheduled PUSCH transmission and GUL transmission is prioritized over scheduled PUSCH transmission. In addition, as indicated above if there is no physical GUL resource available at the time of a scheduled PUSCH transmission, it could still be that the HRLLC data can be mapped on a scheduled PUSCH using the GUL transmission format.

The example embodiments of the invention provide a method and apparatus configured to transmit GUL transmission of high reliable low latency data when both GUL resources and scheduled PUSCH resources are simultaneously available and/or when only scheduled PUSCH resources are available. In accordance with the embodiments a UE prioritizes the HRLLC data transmission over the scheduled PUSCH, and transmits the HRLLC data by using the scheduled PUSCH resources. For the case of simultaneously available GUL and scheduled PUSCH resources, it is of advantage to move the higher priority data to the scheduled PUSCH resources as there should not be that kind of potential collision happening. For the case of only having scheduled PUSCH resources available, it is of advantage to transmit the higher priority data on the scheduled PUSCH resources to decrease the latency for such higher priority data. Operations in accordance with the embodiments include:

The UE autonomously chooses the transport format to be used for high reliable low latency data transmission between GUL format and the scheduled PUSCH format;

In one embodiment, the UE may select one of several GUL formats configured by the eNB.

The UE includes GUL uplink control information in case the UE uses the GUL transmission format;

Specific rate matching parameters are used to match the GUL transmission format with the allocated physical resources on PUSCH; and The eNB can distinguish which transmission format the UE is using based on detection of GUL uplink control information on the scheduled PUSCH resources.

A benefit of using the example embodiments of the invention relates to using GUL transmission format (instead of the scheduled PUSCH transmission format, which might have a larger TBS, higher MCS or similar) for the transmission of HRLLC data on the scheduled (exclusive) PUSCH resources (instead of the potentially shared GUL resources where collisions may occur). The benefit is to move the higher priority data to the scheduled PUSCH as there should not be that kind of potential collision happening or reducing the latency in case no GUL resources would be available simultaneously with the scheduled PUSCH resources.

In accordance with an example embodiments, for a case of simultaneously available GUL and scheduled PUSCH allocations and/or the case of only having scheduled PUSCH resource allocation, there is:

The UE transmitting using the scheduled PUSCH physical resources (i.e. PRBs or interlace); and The UE prioritizing, as needed, the HRLLC data transmission over the scheduled PUSCH;

Such prioritization can be needed if the UE is not able to transmit HRLLC on GUL resources and the scheduled PUSCH on parallel, or if due to reliability issues such parallel transmission would not be advisable;

Such prioritization can be needed if the UE has on parallel to the scheduled PUSCH no GUL resources allocated.

The UE autonomously choosing the transport format (i.e. modulation, TBS, etc.) to be used for transmission on the scheduled PUSCH resources between the HRLL/GUL format (or one of the HRLL/GUL formats) and the scheduled PUSCH format;

The eNB may for the purpose of moving GUL HRLL data to scheduled PUSCH resources configure for the UE more than one GUL transmission format (i.e. modulation, TBS, etc.) to take advantage of the variable size of the scheduled PUSCH transmission. Such ability will increase the HRLL communication efficiency, as potentially more HRLL data can be mapped for a larger amount of scheduled PUSCH resources.

In case the UE decides to transmit using the GUL transmission format, the UE shall also include GUL uplink control information in the transmission on the scheduled PUSCH resources;

In case several GUL transmission formats are configured for the UE, the GUL uplink control information will further include the UE selected GUL transmission format.

and

Specific rate matching parameters are used to match the (selected) GUL transmission format with the allocated physical resources on PUSCH, Such rate-matching may include repetition of the HRLL data block to fill all the available PUSCH resources (and thereby increasing the reliability further)

The eNB can distinguish which transmission format the UE is using based on detection of GUL uplink control information on PUSCH resources. If the eNB detects GUL uplink control information, it assumes the (indicated) GUL transmission format; otherwise it assumes the scheduled PUSCH transmission format. Though mainly thought for cases where the UE is only able to transmit using one UL resource allocation, the example embodiments can include increasing the transmission reliability of HRLL data in cases where the UE is allowed to simultaneously transmit on GUL and scheduled PUSCH resources by having the HRLL data mapped to the GUL as well as the scheduled PUSCH resources.

Figure 2:
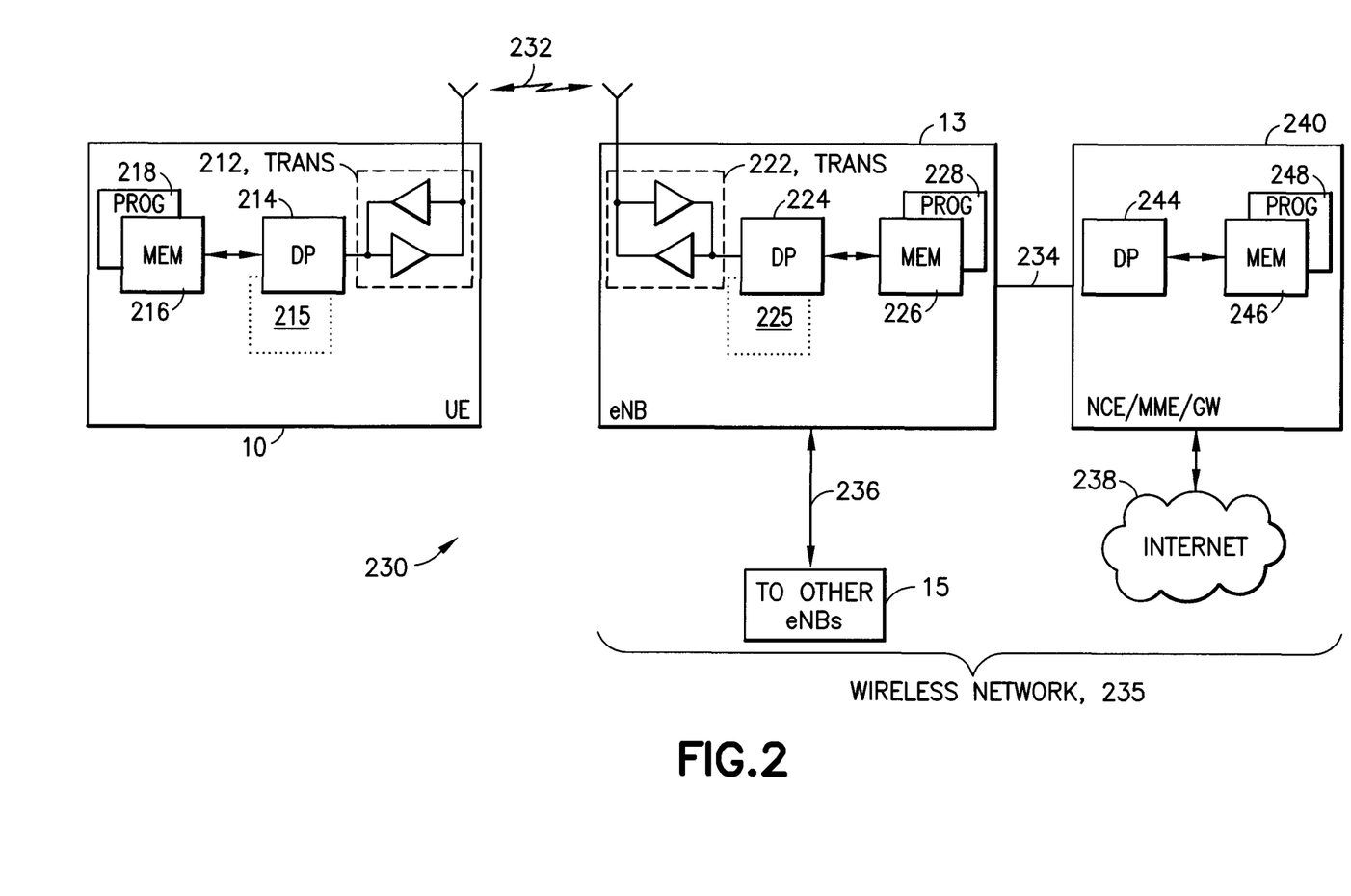
FIG. 2 shows a diagram illustrating some components of a wireless system, such as shown in FIG. 1, which can be used to perform the example embodiments of the invention.

Before describing the exemplary embodiments of the invention in further detail reference is now made to FIG. 2. FIG. 2 illustrates a simplified block diagram illustrating some components of the wireless system shown in FIG. 1 and FIG. 2. Referring also to FIG. 2, in the wireless system 230 a wireless network 235 is adapted for communication over a wireless link 232 with an apparatus, such as a mobile communication device which may be referred to as a UE 10, via a network access node, such as a Node B (base station), and more specifically an eNB 13 such as shown in FIG. 2. The network 235 may include a network control element (NCE) 240 that may include MME/S-GW functionality, and which provides connectivity with a network, such as a telephone network and/or a data communications network (e.g., the internet 238). The NCE 240 may include a WLAN access point as in accordance with an example embodiment of the invention.

The UE 10 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 13 and possibly the NCE 240 via one or more antennas using the data paths 232 and 252, respectively. The PROG 218 can include computer instructions that, when executed by a processor, such as the DP 214, operates in accordance with the example embodiments of the invention.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The eNB 13 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 10 via one or more antennas. The eNB 13 is coupled via a data/control path 234 to the NCE 240. The path 234 may be implemented as an interface, such as an S1 interface. The eNB 13 may also be coupled to another eNB 15 via data/control path 236, which may be implemented as an interface.

The NCE 240 includes a controller, such as a computer or a data processor (DP) 244, a computer-readable memory medium embodied as a memory (MEM) 246 that stores a program of computer instructions (PROG) 248 and possibly a suitable wireless interface, such as radio frequency (RF) transceiver 242, for bidirectional wireless communications with the UE 10 and the eNB 13 via path 234 and/or one or more antennas using the data path 252.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UE 10; by the DP 224 of the eNB 13; and/or by the DP 244 of the NCE 240, or by hardware, or by a combination of software and hardware (and firmware). Base station 15 may have the same type of components as the other base station(s) 13.

For the purposes of describing various exemplary embodiments in accordance with this invention the UE 10 and the eNB 13 may also include dedicated processors, for example Control module 215 and a corresponding Control module 225. Control module 215 and Control module 225 may be constructed so as to operate to perform at least the data transmission and prioritizing operations as in accordance with various exemplary embodiments in accordance with this invention. In accordance with an example embodiment of the invention at least the Control modules 215 and 225 are configurable to perform at least the data transmission and prioritizing operations The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

In accordance with an example embodiment of the invention there is:

In a certain subframe (#n), the UE is simultaneously allocated GUL resources and scheduled PUSCH resources, which may or may not (partially) overlap in the frequency domain or the UE is only having scheduled PUSCH resources;

The UE is enabled (e.g. by eNB configuration) to prioritize HRLL data transmission using GUL transmission format(s) over scheduled PUSCH transmission;

The UE can maintain an ongoing continuous PUSCH transmission, at least for unlicensed band, where channel access is limiting. For licensed band operation, a continuous PUSCH transmission in consecutive subframes is not necessarily a prerequisite;

Based on the presence of HRLL data in the buffer and/or on the impossibility to include HRLL data in the transport block to be transmitted on PUSCH in subframe #n, the UE decides to prioritize the HRLL data transmission is subframe #n. This may happen any time between receiving the PUSCH grant scheduling PUSCH in subframe #n and subframe #n;

The UE can start preparing for transmission in subframe #n using GUL transport format (modulation, transport block size etc.). In case the UE is configured with several GUL transport formats, the UE may select the most appropriate one based on the amount of scheduled PUSCH resources. The UE applies specific rate matching parameters to map HRLL data to scheduled PUSCH physical resources using the GUL transmission format (or one of the GUL transmission formats). Such rate-matching may include the repeating of the HRLLC data block to fill all the available scheduled PUSCH resources/resource elements. The UE will further include a GUL uplink control information indicating the use of the (selected) GUL transport format in the signals to be transmitted on the scheduled PUSCH resources; and In case of a single configured GUL transport format, the eNB can detect which transmission format the UE is using based on the presence (or not) of GUL uplink control information (UCI). If GUL UCI is present, the eNB assumes the GUL transmission format to be transmitted (and the related GUL transport block size); otherwise it assumes the scheduled PUSCH transmission format (and related TB size), or In case of several configured GUL transport format, the eNB can detect which transmission format the UE is using based on the based on the presence (or not) as well as the content of the GUL uplink control information (UCI). If GUL UCI is present, the eNB determine the UE selected GUL transmission format to be transmitted (and the related GUL transport block size) based on the content included in the GUL uplink control information; otherwise it assumes the scheduled PUSCH transmission format (and related TB size).

In an example embodiment of the invention, the UE is allowed to simultaneously transmit on GUL and scheduled PUSCH resources (on either the same or different component carriers). In this case, the UE can decide to transmit HRLL data using GUL transport format on both GUL and scheduled PUSCH resources to increase reliability.

It is noted that a transmission coding rate may be determined based on a transmission block size, which can be adjusted based on one or more replacement transmission parameters.

Figure 3:
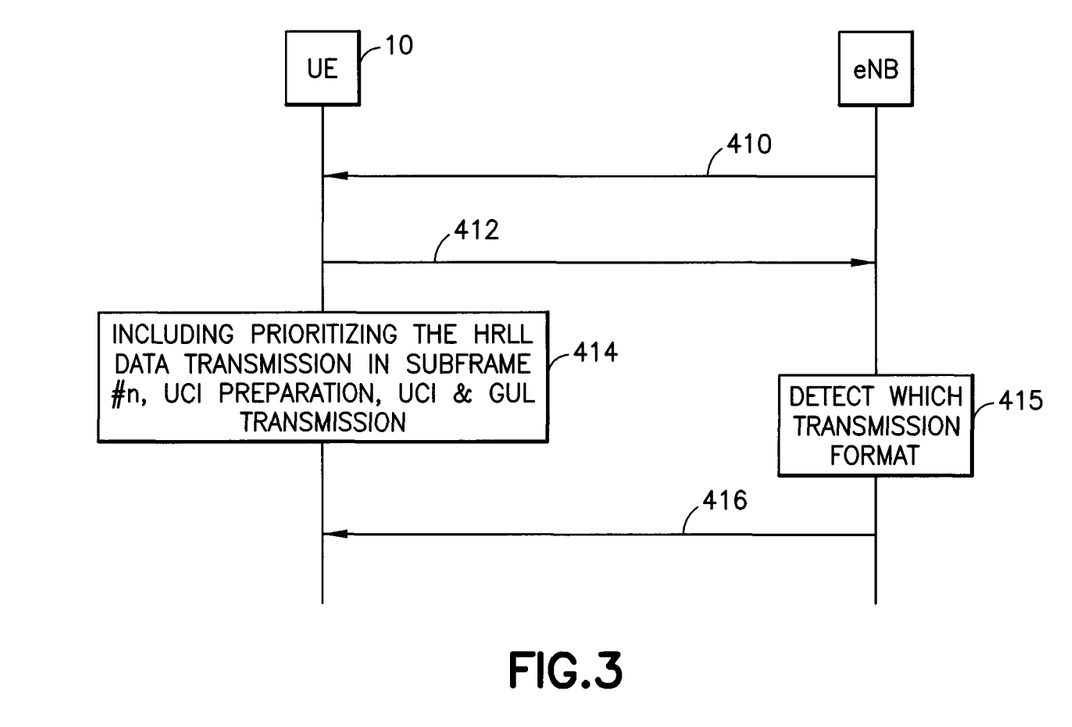
FIG. 3 shows a flow chart of operations in accordance with example embodiments of the invention.

FIG. 3 illustrates a flow chart of operations which may be performed in accordance with the example embodiments of the invention. As shown in FIG. 3, with line 410, in a certain subframe (#n), the UE is simultaneously allocated GUL resources and scheduled PUSCH resources, which may or may not (partially) overlap in the frequency domain. The UE is allowed (e.g. by eNB configuration) to prioritize HRLL data transmission using GUL transmission format over scheduled PUSCH transmission; As shown in FIG. 3 the UE may also have an initiated or ongoing continuous PUSCH transmission 412, that is ongoing at least in case the eNB is operating in unlicensed band where channel access is limiting. For licensed band operation, a continuous PUSCH transmission in consecutive subframes is not necessarily a prerequisite. Based on the presence of HRLL data in the buffer and/or on the impossibility to include HRLL data in the transport block to be transmitted on PUSCH in subframe #n, the UE decides as shown with block 414 to prioritize the HRLL data transmission is subframe #n. This may happen any time between receiving the PUSCH grant scheduling PUSCH resources in subframe #n and subframe #n. In case more than one GUL transport format is configured for the UE, the UE may at the same time select the applicable GUL transport format from the set of configured GUL transport formats. The UE applies specific rate matching parameters to map HRLL data to scheduled PUSCH physical resources using the GUL transmission format (or one of the GUL transmission formats). Such rate-matching may include the repeating the HRLLC data block to fill all the available scheduled PUSCH resources/resource elements. Step 414 also can include that UCI preparation as well as UCI & GUL transmission is from the UE. As shown with line 416 and block 415 the eNB can detect which transmission format the UE is using based on the presence (or not) of GUL uplink control information (UCI), as well as the UCI content. The transmission can be in any of a GUL transmission format or of a PUSCH transmission format. If GUL UCI is present, the eNB assumes a GUL transmission format to be transmitted (and the related GUL transport block size); otherwise it assumes the scheduled PUSCH transmission format (and related TB size). In case several GUL transport formats are configured and the UE has therefore selected one of them, the eNB will know based on the content of the GUL UCI the selected GUL transport format.

A main advantage of the proposed embodiments is that the eNB only needs to perform decoding on the scheduled PUSCH resources for a scheduled UE, and it does not require multiple hypothesis tests at the eNB or a NodeB. Moreover, so far the transmission of more than a single UL resource allocation on a carrier is not supported—where a proposed solution in accordance with the example embodiments clarifies the UE behavior in case of conflicts of scheduled PUSCH and latency critical HRLL data.

Another additional advantage is the reduced collision probability of this method in accordance with the example embodiments. For GUL resources several UEs may be able to use the GUL transmission opportunities on the same physical resources (i.e., on the GUL resources) resulting in collisions/intra-cell interference. Moving the more critical HRLL data to the scheduled PUSCH resources (or duplicating the HRLL data blocks also to the PUSCH resources in the simultaneous GUL/PUSCH option) will likely decrease the collision probability with transmissions of other UEs.

Figure 4A:
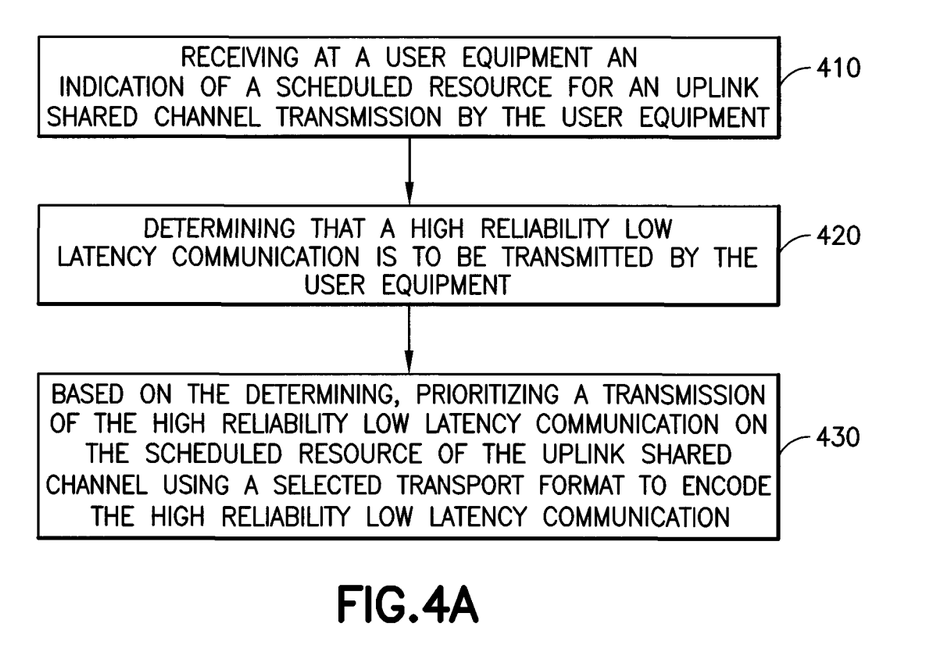
FIG. 4a and FIG. 4b each show a method in accordance with example embodiments of the invention which may be performed by an apparatus.

FIG. 4a illustrates operations which may be performed by a device such as, but not limited to, a device (e.g., the UE 10 as in FIG. 2). As shown in step 410 there is receiving at a user equipment an indication of a scheduled resource for an uplink shared channel transmission by the user equipment. As shown in step 420 there is determining that a high reliability low latency communication is to be transmitted by the user equipment. Then as shown in step 430 of FIG. 4a there is based on the determining, prioritizing a transmission of the high reliability low latency communication on the scheduled resource of the uplink shared channel using a selected transport format to encode the high reliability low latency communication.

In accordance with the example embodiments as described in the paragraph above, the indication is received in an uplink grant.

In accordance with the example embodiments as described in the paragraphs above, the high reliability low latency communication by the user equipment applies a grant-less uplink transport format.

In accordance with the example embodiments as described in the paragraphs above, the uplink grant is allocating scheduling resources for the uplink shared channel transmission.

In accordance with the example embodiments as described in the paragraphs above, the prioritizing comprises: preparing the high reliability low latency communication using a grant-less uplink transport format to be transmitted on the scheduled uplink shared channel resource.

In accordance with the example embodiments as described in the paragraphs above, the selected transport format comprises a grant-less uplink transport format.

In accordance with the example embodiments as described in the paragraphs above, the transmission of the high reliability low latency communication includes GUL uplink control information based on a use of the grant-less uplink transport format.

In accordance with the example embodiments as described in the paragraphs above, a grant-less uplink transport format is defined based on a single configured format or alternatively selected by the apparatus from the set of more than one configured grant-less uplink transport formats.

In accordance with the example embodiments as described in the paragraphs above, the preparing comprises applying rate matching parameters to map the high reliability low latency communication using a grant-less uplink transport format to the scheduled resources provided by the uplink grant.

In accordance with the example embodiments as described in the paragraphs above, the applying comprises repeating the high reliability low latency communication using a grant-less uplink transport format to fill all available scheduled resources provided by the uplink grant.

In accordance with the example embodiments as described in the paragraphs above, the transmission of the high reliability low latency communication includes uplink control information.

In accordance with the example embodiments as described in the paragraphs above, the uplink control information is indicative of a grant-less uplink transport format selected for the transmission.

A non-transitory computer-readable medium (MEM 216 of FIG. 2) storing program code (PROG 218 of FIG. 2), the program code executed by at least one processor (DP 214 and/or DP 215 of FIG. 2) to perform the operations as at least described in the paragraphs above.

In accordance with an example embodiment of the invention as described above there is an apparatus comprising: means for receiving (wireless link 232, radio frequency (RF) transceiver 212 as in FIG. 2) at a user equipment (UE 10 as in FIG. 2) an indication of a scheduled resource for an uplink shared channel transmission by the user equipment; means for determining (MEM 216, PROG 218, DP 214/215 of FIG. 2) that a high reliability low latency communication is to be transmitted by the user equipment; and means, based on the determining, for prioritizing (MEM 216, PROG 218, DP 214/215 of FIG. 2) a transmission of the high reliability low latency communication on the scheduled resource of the uplink shared channel using a selected transport format to encode the high reliability low latency communication.

In the example aspect of the invention according to the paragraph above, wherein at least the means for receiving, determining, and prioritizing comprises a non-transitory computer readable medium [MEM 216] encoded with a computer program [PROG 218] executable by at least one processor [DP 214 and/or control module 215].

Figure 4B:
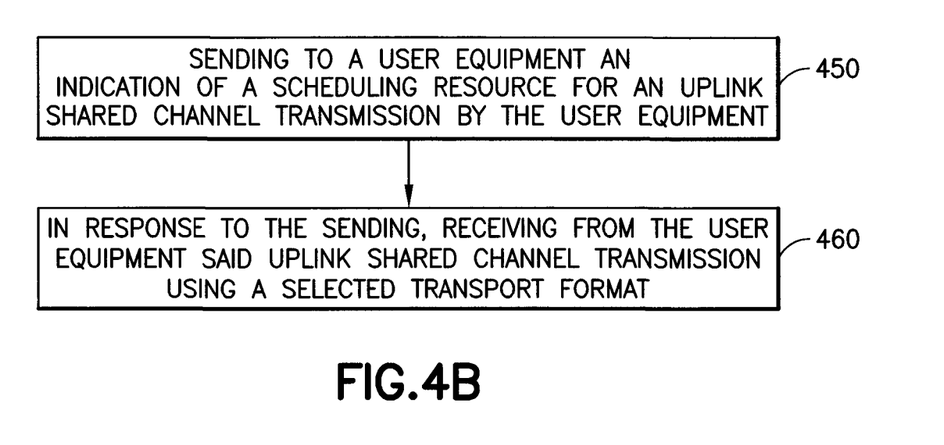

FIG. 4b illustrates operations which may be performed by a network device such as, but not limited to, a network node eNB 13 as in FIG. 2 or an eNB. As shown in step 450 of FIG. 4b there is sending to a user equipment an indication of a scheduling resource for an uplink shared channel transmission by the user equipment. Then in step 460 of FIG. 4b there is, in response to the sending, receiving from the user equipment said uplink shared channel transmission using a selected transport format.

In accordance with the example embodiments as described in the paragraph above, the indication is sent in an uplink grant.

In accordance with the example embodiments as described in the paragraphs above, the uplink grant is allocating scheduling resources for the uplink shared channel transmission.

In accordance with the example embodiments as described in the paragraphs above, the uplink shared channel transmission applies the scheduled uplink shared channel transport format.

In accordance with the example embodiments as described in the paragraphs above, the uplink shared channel transmission applies a grant-less uplink transport format.

In accordance with the example embodiments as described in the paragraphs above, the transmission comprises a high reliability low latency communication received from the user equipment.

In accordance with the example embodiments as described in the paragraphs above, the at least one memory including the computer program code is configured with the at least one processor to determine whether the transmission includes uplink control information.

In accordance with the example embodiments as described in the paragraphs above, for a case it is determined that the transmission includes uplink control information, the at least one memory including the computer program code is configured with the at least one processor to cause the apparatus to identify the selected transport format as a grant-less uplink transport format.

In accordance with the example embodiments as described in the paragraphs above, for a case it is determined that the transmission does not include uplink control information, the at least one memory including the computer program code is configured with the at least one processor to cause the apparatus to identifying the selected transport format as a scheduled uplink shared channel transport format.

A non-transitory computer-readable medium (MEM 226 of FIG. 2) storing program code (PROG 228 of FIG. 2), the program code executed by at least one processor (DP 224 and/or DP 225 of FIG. 2) to perform the operations as at least described in the paragraphs above.

In accordance with an example embodiment of the invention as described above there is an apparatus comprising: means for sending (wireless link 232, radio frequency (RF) transceiver 222, MEM 226, PROG 228, DP 224/225 of FIG. 2) to a user equipment an indication of a scheduling resource for an uplink shared channel transmission by the user equipment; and means, in response to the sending, for receiving (wireless link 232, radio frequency (RF) transceiver 222, MEM 226, PROG 228, DP 224/225 of FIG. 2) from the user equipment said uplink shared channel transmission using a selected transport format.

In the example aspect of the invention according to the paragraph above, wherein at least the means for sending and receiving comprises a non-transitory computer readable medium [MEM 226] encoded with a computer program [PROG 228] executable by at least one processor [DP 224 and/or control module 225].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method, comprising:
receiving at a user equipment an indication of scheduled resources for an uplink shared channel transmission by the user equipment;
determining that a high reliability low latency communication is to be transmitted by the user equipment;
based on the determining, prioritizing a transmission of the high reliability low latency communication on the scheduled resources of the uplink shared channel, wherein the prioritizing is using a selected transport format to encode the high reliability low latency communication on the scheduled resources or both of the scheduled resources and grant-less uplink resources,
wherein the grant-less uplink resources and the scheduled resources are at least partially overlapping in at least one of frequency or time; and
wherein the transmission of the high reliability low latency communication includes grant-less uplink control information based on a use of a grant-less uplink transport format transmitted on the scheduled resources or both the scheduled resources and the grant-less uplink resources.

2. An apparatus comprising:
at least one processor; and at least one memory including computer program code, where the at least one memory and the computer program code are configured, with the at least one processor, to cause the apparatus to at least:
receive at a user equipment an indication of scheduled resources for an uplink shared channel transmission by the user equipment;
determine that a high reliability low latency communication is to be transmitted by the user equipment; and
based on the determining, prioritize a transmission of the high reliability low latency communication on the scheduled resources of the uplink shared channel, wherein the prioritizing is using a selected transport format to encode the high reliability low latency communication on the scheduled resources or both the scheduled resources and grant-less uplink resources,
wherein the grant-less uplink resources and the scheduled resources are at least partially overlapping in at least one of frequency or time; and
wherein the transmission of the high reliability low latency communication includes grant-less uplink control information based on a use of a grant-less uplink transport format transmitted on the scheduled resources or both the scheduled resources and the grant-less uplink resources.

3. The apparatus according to claim 2, wherein the high reliability low latency communication by the user equipment applies the grant-less uplink transport format.

4. The apparatus of claim 2, wherein the indication is received in an uplink grant.

5. The apparatus according to claim 4, wherein the uplink grant is allocating scheduling resources for the uplink shared channel transmission.

6. The apparatus of claim 4, wherein the prioritizing comprises: preparing the high reliability low latency communication using the grant-less uplink transport format to be transmitted on a scheduled uplink shared channel resource.

7. The apparatus of claim 6, wherein the preparing comprises applying rate matching parameters to map the high reliability low latency communication using the grant-less uplink transport format to the scheduled resources provided by the uplink grant.

8. The apparatus of claim 7, wherein the applying comprises repeating the high reliability low latency communication using the grant-less uplink transport format to fill all available scheduled resources provided by the uplink grant.

9. The apparatus according to claim 2, wherein the selected transport format comprises the grant-less uplink transport format.

10. The apparatus of claim 2, wherein the grant-less uplink transport format is defined based on a single configured format or alternatively selected by the apparatus from the set of more than one configured grant-less uplink transmissions formats.

11. The apparatus according to claim 2, wherein the transmission of the high reliability low latency communication includes uplink control information, and wherein the uplink control information is indicative of the grant-less uplink transport format selected for the transmission.

12. The method according to claim 1, wherein the selected transport format is a transport format that is one of transport format scheduled or configured for transmission on the grant-less uplink resource.

13. An apparatus comprising:
at least one processor; and
at least one memory including computer program code, where the at least one memory and the computer program code are configured, with the at least one processor, to cause the apparatus to at least:
send to a user equipment an indication of scheduling resources for an uplink shared channel transmission by the user equipment; and
in response to the sending, receive from the user equipment said uplink shared channel transmission prioritized using a selected transport format to encode a high reliability low latency communication on the scheduled resources or both the scheduled resources and a grant-less uplink resources, wherein the grant-less uplink resources and the scheduled resources are at least partially overlapping in at least one of frequency or time, and wherein the uplink shared channel transmission of the high reliability low latency communication including grant-less uplink control information is based on a use of a grant-less uplink transport format.

14. The apparatus of claim 13, wherein the indication is sent in an uplink grant, and wherein the uplink grant is allocating scheduling resources for the uplink shared channel transmission.

15. The apparatus of claim 13, wherein the uplink shared channel transmission applies the scheduled uplink shared channel transport format.

16. The apparatus according to claim 13, wherein the uplink shared channel transmission applies the grant-less uplink transport format.

17. The apparatus according to claim 13, wherein the at least one memory including the computer program code is configured with the at least one processor to cause the apparatus to: determine whether the transmission includes uplink control information.

18. The apparatus of claim 17, comprising:
for a case it is determined that the transmission includes uplink control information, the at least one memory including the computer program code is configured with the at least one processor to cause the apparatus to:
identify the selected transport format as the grant-less uplink transport format.

19. The apparatus of claim 17, comprising:
for a case it is determined that the transmission does not include uplink control information, the at least one memory including the computer program code is configured with the at least one processor to cause the apparatus to:
identify the selected transport format as a scheduled uplink shared channel transport format.

\* \* \* \* \*